United States Patent
Miyamoto (10) Patent No.: US 6,178,452 B1
(45) Date of Patent: Jan. 23, 2001

(54) METHOD OF PERFORMING SELF-DIAGNOSING AND SELF-REPAIRING AT A CLIENT NODE IN A CLIENT/SERVER SYSTEM

(75) Inventor: Takashi Miyamoto, Tokushima (JP)

(73) Assignee: Fujitsu Limited, Kawasaki (JP)

( * ) Notice: Under 35 U.S.C. 154(b), the term of this patent shall be extended for 0 days.

(21) Appl. No.: 09/227,109

(22) Filed: Jan. 5, 1999

(30) Foreign Application Priority Data

Mar. 17, 1998 (JP) ................................................. 10-067500

(51) Int. Cl.[7] ....................................................... G06F 11/00
(52) U.S. Cl. ........................... 709/224; 709/102; 709/223; 714/6; 714/25
(58) Field of Search .................................. 709/102, 203, 709/208, 217, 218, 219, 223, 224, 319; 714/4, 5, 6, 25

(56) References Cited

U.S. PATENT DOCUMENTS

| | | | |
|---|---|---|---|
| 5,704,031 | * 12/1997 | Mikami et al. ........................... | 714/4 |
| 5,754,752 | * 5/1998 | Sheh et al. ............................... | 714/4 |
| 5,852,713 | * 12/1998 | Shannon .................................... | 714/6 |
| 5,873,103 | * 2/1999 | Trede et al. ............................ | 707/204 |
| 5,930,824 | * 7/1999 | Anglin et al. ......................... | 711/162 |

FOREIGN PATENT DOCUMENTS 8-272643   10/1996   (JP) .

\* cited by examiner

Primary Examiner—Viet D. Vu
(74) Attorney, Agent, or Firm—Staas & Halsey LLP (57) ABSTRACT

A client/server system wherein a file which has been repeatedly repaired for time equal to or more than certain times, a file which has been repeatedly repaired with frequency equal to or higher than a certain degree of frequency and a file having a file size equal to or larger than a certain size are backup-stored in the local backup file 24 of the client unit 2 itself and wherein when a file backed up in the local backup file 24 needs to be repaired, not repair by the server unit 1 but self-repair within the client unit 2 itself is effected. In such client/server system, when the number of client units increases, there is no need to review the capability of the server unit and of the transmission paths and then to redesign them and the addition of a client unit can be optionally made.

6 Claims, 7 Drawing Sheets

| FILE | NUMBER OF REPAIR | FILE SIZE | REPAIR FREQUENCY |
|---|---|---|---|
| A01 | 8 | 50MB | 10/25 |
| A03 | 15 | 15MB | 2/27 |
| A11 | 18 | 80MB | 15/18 |
| B21 | 0 | 250MB | 0/20 |
| B24 | 2 | 15MB | 2/24 |
| B25 | 4 | 75MB | 4/20 |
| C01 | 8 | 90MB | 8/16 |
| C40 | 13 | 220MB | 13/18 |
|  |  |  |  |
| LOCAL RETAINING CONDITION | 15 | 150MB | 10/10 |
| REMAINING QUANTITY | 1200MB |  |  |

| PC1: CAUSING COMPUTER TO DIAGNOSE AS TO WHETHER OR NOT FILE STORED IN CLIENT SYSTEM FILE 21 NEEDS TO BE REPAIRED |
|---|
| PC2: CAUSING COMPUTER TO SELECT WHETHER FILE REPAIR SOURCE OF FILE WHICH IS DIAGNOSED AS REQUIRING REPAIRING PROCESS IS BACKUP FILE 11 OF SERVER UNIT 1 OR LOCAL BACKUP FILE 24 OF CLIENT UNIT 2 ITSELF |
| PC3: CAUSING COMPUTER TO DOWNLOAD NECESSARY FILE FROM BACKUP FILE 11 OF SERVER UNIT 1 OR LOCAL BACKUP FILE 24 OF CLIENT UNIT 2 ITSELF, AND TO STORE DOWNLOADED FILE IN CLIENT SYSTEM FILE 21 OF CLIENT UNIT 2 ITSELF |
| PC4: CAUSING COMPUTER TO DIAGNOSE AS TO WHETHER OR NOT FILE DOWNLOADED FROM BACKUP FILE 11 OF SERVER UNIT 1 AND REPAIRED FILE SATISFY PREDETERMINED CONDITION |
| PC5: CAUSING COMPUTER TO DOWNLOAD FILE WHICH HAS BEEN DIAGNOSED AS SATISFYING PREDETERMINED CONDITION, FROM BACKUP FILE 11 TO LOCAL BACKUP FILE 24 OF CLIENT UNIT 2 ITSELF AND TO BACKUP-STORE FILE THEREIN |
| PC6: CAUSING COMPUTER TO READ, AS PREDETERMINED CONDITION, AT LEAST ONE OF NUMBER OF REPAIRS, FREQUENCY OF REPAIRS, FILE SIZE, REMAINING CAPACITY OF LOCAL BACKUP FILE 24 |

METHOD OF PERFORMING SELF-DIAGNOSING AND SELF-REPAIRING AT A CLIENT NODE IN A CLIENT/SERVER SYSTEM

BACKGROUND OF THE INVENTION

The present invention relates to a client/server system. More specifically, the present invention relates to an automatic maintenance technique for automatically maintaining a client under control of the client itself as well as a computer executing such self maintenance and a recording medium therefor.

In recent years, as the performance of general purpose computer such as a personal computer is enhanced, the client/server systems widely spread. Speaking of the client/server system, there are some cases where a user's operational error, simple environment setting error or the like tends to cause such a problem as to influence the overall network system. When the problem occurs, the server is incapable of sending a maintenance command to the client. In those cases, there is a fear that not only maintenance cannot be executed but also the system may become inoperable until the system is recovered. The fear grows as the number of clients connecting to the server increases. With the network system becoming larger, there is no ignoring economical damages this may cause.

Moreover, the infection of computer viruses is recently becoming a serious problem to the system using a plurality of general purpose computers as clients and a server such as a client/server system. Namely, when a computer virus enters a general purpose computer serving as one of the plural clients in the client/server system, then the virus spreads over all clients and the server via the network, thus entailing a big loss. Considering this, to comfortably operate the client/server system, it is vital to efficiently execute system maintenance.

Meanwhile, for the maintenance of respective clients in the conventional client/server system, there has been adopted a so-called top-down method, i.e., the method in which a user stores necessary information about maintenance in the server and a maintenance command is issued from the server. In this top-down method, however, the maintenance command is basically issued to all clients connecting to the server all at once. Owing to this, every time maintenance work is being done, excessive loads are imposed on the server and the transmission path. During that time, all clients is inoperative simultaneously, with the result that the overall system performance is disadvantageously lowered.

As can be understood from the above, the conventional client/server system requires maintenance work and the maintenance time largely depends on the maintenance capability of the server or the communication capability of the transmission path. When a problem occurs, clearing up the cause has to depend on the capability of the user or of maintenance personnel. As a result, not only the recovery of the system cannot be expected quickly but also this eventually troubles the user and maintenance personnel.

Under these circumstances, the inventor of the present application filed an invention identified as Japanese Patent Application Laid-Open No. 8-272643. According to the Japanese Patent Application Laid-Open No. 8-272643, self-maintenance capability is provided to clients, with which individual clients make self-diagnoses when powered, and only when some problem occurs, only necessary file(s) is downloaded from the backup system of the clients stored in the server and the self-repair processing is carried out. The Japanese Patent Application Laid-Open No. 8-272643 is thus designed to reduce loads imposed on the server and the transmission paths, to decrease the probability that the system becomes inoperative and to enhance the overall system capability by allowing the respective clients to execute self-maintenance.

Nevertheless, there are many cases recently where the size of software installed into clients is as large as that in units of 100 MB. This requires increasing the capacity of the memory of the server. In addition, when such software are downloaded from the server into the clients, the higher loads are imposed on the transmission paths. This causes the lowering of system response and many clients requiring maintenance have to wait due to delayed response. For that reason, when the number of clients increases, it is necessary to review the capability of the server and that of the transmission paths and to redesign them. In some cases, there is a fear that the number of the clients cannot be even increased.

BRIEF SUMMARY OF THE INVENTION

The present invention has been made in view of these circumstances. In short, it is an object of the present invention to provide a recording medium recording computer program for the client/server system and the clients thereof capable of reducing loads imposed on the overall system during the maintenance of clients, by backup-storing files, which need to be repaired many times, have a large size and are repaired with high frequency, in the clients themselves to prevent these files from being transferred on the transmission paths.

It is also an object of the present invention to provide a computer used as a client of the above-stated client/server system.

Furthermore, the present invention relates to a recording medium recording computer program for allowing such a computer to execute self-maintenance.

A client/server system according to the present invention is a client/server system including a server computer and a client computer connected to a network, wherein the server computer comprises first storing means for storing files of software which can be installed into the client computer; and the client computer comprises: second storing means for storing files of software installed into the client computer itself; third storing means for storing at least one of the files stored in the second storing means; self-diagnosing means for diagnosing whether or not a file stored in the second storing means needs to be repaired; repair source selecting means for selecting one of reading and repairing the file which is diagnosed as requiring repair processing by the self-diagnosing means from the first storing means of the server computer, and reading and repairing the same from the third storing means of the client computer; file repairing means for repairing the file which is diagnosed as requiring repairing processing by the self-diagnosing means, by reading the file from the repair source selected by the repair source selecting means and storing the file in the second storing means of the client computer itself; judging means for judging whether or not the file read from the first storing means of the server computer and repaired by the file repairing means satisfies predetermined conditions for storing the file in the third storing means of the client computer itself; and backup means for backing up the file which is judged to satisfy the predetermined conditions by the judging means, by reading the file from the second storing means of the client computer itself, and by storing the file in the third storing means of the client computer itself.

In the client/server system according to the present invention as mentioned above, files satisfying predetermined conditions, such as a file which has been repeatedly repaired for times equal to or more than certain times, a file which has been repeatedly repaired with frequency equal to or higher than a certain degree of frequency and a file which has a file size equal to or larger than a certain size, are backup-stored in the third storing means of the client computer itself. When the file backed up in the third storing means needs to be repaired, not repair by the server computer but self-repair within the client computer can be effected.

The client/server system according to the present invention is characterized in that, in addition to the above-stated structure, the client computer further comprises fourth storing means for storing, as the predetermined conditions, at least one of the number of repairs, the frequency of repairs, a file size of each file, and remaining capacity of the third storing means.

In the client/server system according to the present invention as mentioned above, at least one of the number of repairs, the frequency of repairs, the file size of each file and the remaining capacity of the third storing means is read as a predetermined condition from the fourth storing means of the client computer and it is judged whether or not the file is read from the second storing means of the client computer itself and backup-stored in the third storing means of the client computer itself.

A computer according to the present invention is a computer which can read files of software from first storing means connected through a network, comprising: second storing means for storing files of the software installed in the computer itself; third storing means for storing at least one of the files stored in the second storing means; self-diagnosing means for diagnosing whether or not a file stored in the second storing means needs to be repaired; repair source selecting means for selecting one of reading and repairing the file which is diagnosed as requiring repair processing by the self-diagnosing means from the first storing means through the network, and reading and repairing the same from the third storing means of the computer itself; file repairing means for repairing the file which is diagnosed as requiring repair processing by the self-diagnosing means, by reading the file from the repair source selected by the repair source selecting means and storing the file in the second storing means of the computer itself; judging means for judging whether or not the file read from the first storing means through the network and repaired by the file repairing means satisfies predetermined conditions for storing the file in the third storing means of the computer itself; and backup means for backing up the file which is judged to satisfy the predetermined conditions by the judging means, by reading the file from the second storing means of the computer itself, and by storing the file in the third storing means of the computer itself.

In the computer according to the present invention as mentioned above, files satisfying predetermined conditions, such as a file which has been repeatedly repaired for times equal to or more than certain times, a file which has been repeatedly repaired with frequency equal to or higher than a certain degree of frequency and a file which has a file size equal to or larger than a certain size, are backup-stored in the third storing means of the computer itself. When the file backed up in the third storing means needs to be repaired, not repair by the first storing means via the network but self-repair within the computer can be effected.

The computer according to the present invention is characterized in that, in addition to the above-stated structure, the client computer comprises fourth storing means for storing, as the predetermined conditions, at least one of the number of repairs, the frequency of repairs, a file size of each file, and remaining capacity of the third storing means.

In the computer according to the present invention as mentioned above, at least one of the number of repairs, the frequency of repairs, the file size of each file and the remaining capacity of the third storing means is read as a predetermined condition from the fourth storing means of the computer and it is judged whether or not the file is read from the second storing means of the computer itself and backup-stored in the third storing means of the computer itself.

Moreover, a recording medium according to the present invention is a recording medium which records computer program for causing a computer to execute self-maintenance, the computer capable of reading files of software from first storing means connected through a network, and comprising computer readable second storing means for storing files of software installed into the computer itself and computer readable third storing means for storing at least one of the files stored in the second storing means, the computer program including: computer readable program code means for causing a computer to diagnosis whether or not a file stored in the second storing means needs to be repaired; computer readable program code means for causing a computer to select one of reading and repairing the file which is diagnosed as requiring repair processing from the first storing means through the network, and reading and repairing the same from the third storing means; computer readable program code means for causing a computer to read the file which is diagnosed as requiring repair processing from the selected repair source and to store the file in the second storing means; computer readable program code means for causing a computer to judge whether or not the file read from the first storing means through the network and repaired satisfies predetermined conditions for storing the file in the third storing means; and computer readable program code means for causing a computer to back up the file which is judged to satisfy the predetermined conditions, by reading the file from the second storing means, and to store the file in the third storing means.

When the recording medium according to the present invention as mentioned above is installed into a computer, files satisfying predetermined conditions, such as a file which has been repeatedly repaired for times equal to or more than certain times, a file which has been repeatedly repaired with frequency equal to or higher than a certain degree of frequency and a file which has a file size equal to or larger than a certain size, are backup-stored in the third storing means of the computer. When the file backed up in the third storing means needs to be repaired, not repair by the first storing means through the network but self-repair within the computer is effected.

Further, the recording medium according to the present invention is characterized in that the computer program further including, in addition to the above-stated structure, computer readable program code means for causing a computer to read from computer readable fourth storing means provided to the computer, as the predetermined conditions, at least one of the number of repairs, the frequency of repairs, a file size of each file and remaining capacity of the third storing means.

When the recording medium according to the present invention as mentioned above is installed into a computer, at least one of the number of repairs, the frequency of repairs, the file size of each file and the remaining capacity of the third storing means is read as a predetermined condition from the fourth storing means of the computer, and it is judged whether or not the file is read from the second storing means of the computer and backup-stored in the third storing means of the computer.

The above and further objects and features of the invention will more fully be apparent from the following detailed description with accompanying drawings.

DESCRIPTION OF THE PREFERRED EMBODIMENTS

Figure 1:
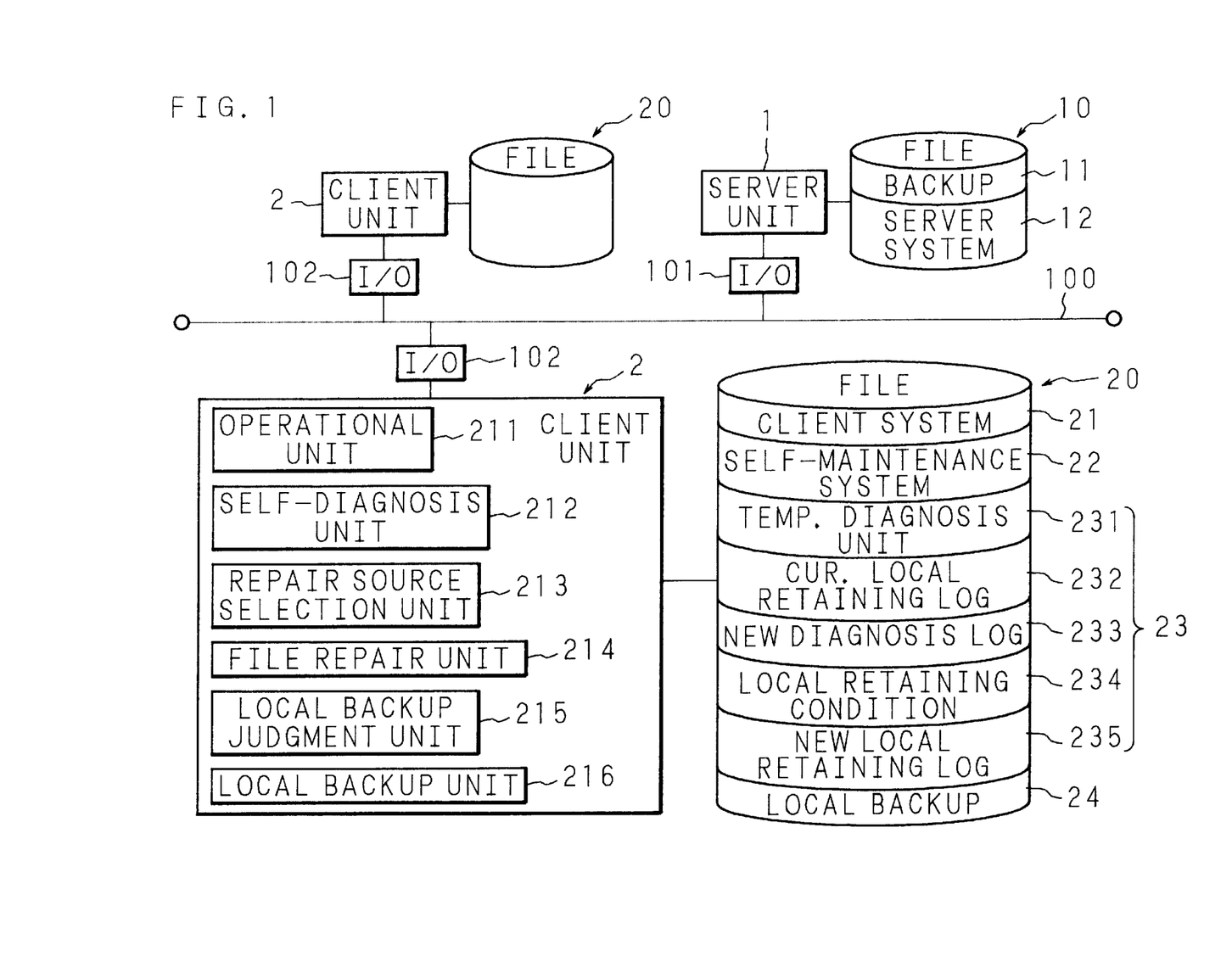
FIG. 1 is a typical view showing an example of the overall structure of a client/server system according to the present invention.

The present invention will now be described in detail with reference to the drawings illustrating the embodiments thereof. FIG. 1 is a typical view showing an example of the overall structure of a client/server system according to the present invention.

In FIG. 1, reference numeral 100 denotes a LAN line and reference numerals 1 and 2 denote a server computer (to be referred to as a server unite hereinafter) and a client computer (to be referred to as a "client unit" hereinafter), respectively. They are all connected to the LAN line 100, all of which constitutes a network system as a whole. It is noted that a plurality of server units 1 and a plurality of client units 2 can be connected to a single LAN line 100. For the sake of illustration, FIG. 1 shows a case where one server unit 1 and two client units 2 are connected to the LAN line 100.

The client unit 2 is a computer of the present invention. It functions as the client unit 2 of the client/server system according to the present invention by reading program codes from a recording medium according to the present invention to be described later.

Each of the server unit 1 and the client unit 2 is a general purpose computer provided with a normal CPU, a memory, disk unit (such as a hard disk, a flexible disk), a printer, a display, a keyboard, a mouse, and the like as hardware.

Large quantity storage media 10 and 20 utilizing hardware, such as a hard disk and a magnetic tape, are connected to each unit and various software are installed into the unit.

The server unit 1 and the client unit 2 are connected to the LAN line 100 by an I/O interface 101 and an I/0 interface 102 as a hardware, respectively.

File structure information, such as a backup file 11 of a client, a server system file 12, and the like, is stored in the storage medium 10, acting as the first storing means, of the server unit 1. The backup file 11 stores data for backing up the file of the client system common to the client units 2. The server system file 12 stores file structure software of various types necessary for the operation of the server unit 1 itself.

The storage medium 20, acting as the second storing means, of the client unit 2 stores file structure information, such as a client system file 21, a self-maintenance system file 22, a working file 23, a local backup file 24, and the like.

The client system file 21, acting as the third storing means, stores file structure software of various types necessary for the client unit 2. When the software are executed by the client unit 2, it functions as an operational unit 211. When ordinary application software, for example, a word processor, a spreadsheet, and the like stored in the client system file 21 are executed by the client unit 2, then the operational unit 211 executes the functions of the software.

The self-maintenance system file 22 stores file structure software of various types necessary for the self-maintenance of the client unit 2. When the software are executed by the client unit 2, it function as a self-diagnosis unit 212, a repair source selection unit 213, a file repair unit 214, a backup judgment unit 215 and a local backup unit 216.

The self-diagnosis unit 212 executes a self-diagnosis of the client unit 2 at appropriate timing such as when the power is turned on or when a user issues a command. The repair source selection unit 213 selects either the server unit 1 or the client unit 2 itself which is to be repaired or from which a necessary file is acquired when the self-diagnosis unit 212 diagnoses the client unit 2 as requiring repair. The file repair unit 214 uploads the file previously diagnosed as requiring a repair by the self-diagnosis unit 212 from the repair source selected by the repair source selection unit 213. The local backup judgment unit 215 makes a diagnosis as to whether or not there exists a file whose repair source to be newly changed to the local (client unit 2 itself) according to the content of a local retaining condition file 234 to be described later. As a result of the diagnosis by the above-stated local backup judgment unit 215, the local backup unit 216 causes the file having the repair source newly changed to the local backup file 24, to be backed up into the local backup file 24 from the client system file 21.

The working file 23 stores file structure information such as a temporary diagnosis file 231, a current local retaining log file 232, a new diagnosis log file 233, a local retaining condition file 234, a new local retaining log file 235, and the like.

The temporary diagnosis log file 231 is a file for temporarily storing the result of a diagnosis every time the self-diagnosis unit 212 functions to make a self-diagnosis.

The current local retaining log file 232 stores information, such as a file name, for identifying a file currently stored in the local backup file 24.

The new diagnosis log file 233 stores the result of a judgment made by the repair source selection unit 213 as to whether the repair source of each file is in the local (the client unit 2 itself) or in the server unit 1 according to the content of the above-stated temporary diagnosis log file 231.

The local retaining condition file 234 stores conditions for which individual files are to be stored in the local, that is the server unit 1. The conditions involve, for example, the number of repairs, the number (frequency) of continuous/discontinuous repairs for indicating whether or not a repair is needed every time self-maintenance is executed, the size (maximum size, minimum size) of the local retaining log file which is the capacity needed when storing the files in the local backup file 24, remaining disk capacity for indicating the remaining capacity of the local backup file 24, and the like.

Furthermore, the new local retaining log file 235 stores information such as that for identifying a file currently stored in the local backup file 24, that for identifying a file newly judged to be stored in the local backup file 24 by the local backup judgment unit 215, and the like. The content of the current local retaining log file 232 is replaced by that of the new local retaining log file 235 every time self-maintenance is over.

The operation of the client/server system according to the present invention during the self-maintenance of the client will be described with reference to the flow chart of FIG. 2 and FIG. 3 which shows the procedure as well as typical views exemplifying the contents of the respective working files 23 of FIG. 4 and FIG. 5.

When a certain client unit 2 is activated by turning its power on, the self-diagnosis unit 212, the repair source selection unit 213, the local backup judgment unit 215 and the local backup unit 216 are activated by the software stored in the self-maintenance system file 22 of the client unit 2 for executing a self-diagnosis. First, the self-diagnosis unit 212 executes the self-diagnosis of the client unit 2 (step S11). In this embodiment, self-maintenance can be executed at any timing by being given a command from the user, in addition to at the timing at which the power is on, as long as it is timing at which maintenance processing is made possible.

By executing a self-diagnosis by the self-diagnosis unit 212, a temporary diagnosis log file 231 recording the result of the self-diagnosis is generated (step S12). More specifically, the self-diagnosis unit 212 makes a diagnosis as to the system environment of the client unit 2, i.e., whether or not the file of software, farm-ware or the like is changed (deleted, newly generated or changed). Information for identifying the file undergoing change is recorded in the temporary diagnosis log file 231.

Figure 4A:
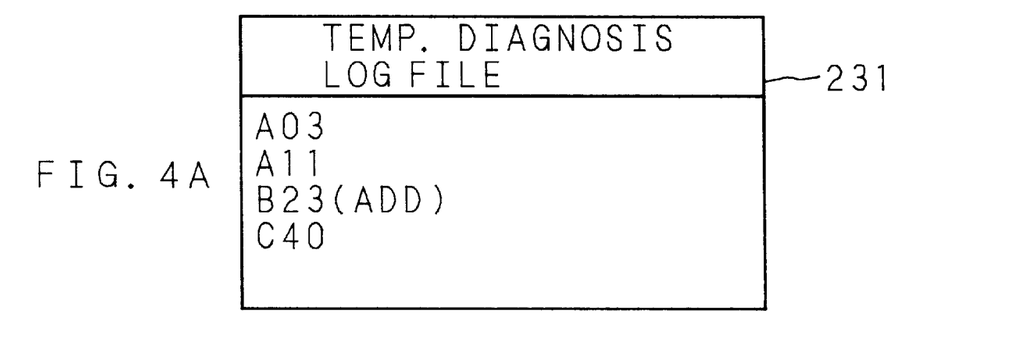
FIGS. 4A, FIG. 4B, FIG. 4C and FIG. 4D are typical views showing the contents of working files during self-maintenance by the client unit of the client/server system according to the present invention.

As shown in, for example, FIG. 4A, it is assumed that the temporary diagnosis log file 231 records that files "A03", "A11", "B23" and "C40" are changed.

Next, the repair source selection unit 213 reads the temporary diagnosis log file 231 (step S13) and judges whether or not it is necessary to add a file and/or a directory to the client unit 2 itself (step S14). As a result, when it is judged that the addition of a file and/or a directory is necessary ("YES" in step S14), the repair source selection unit 213 writes the names of a file and/or directory needed to be added in the new diagnosis log file 233 (step S15). This is because the file and/or directory need to be newly downloaded from the server unit 1.

Figure 4B:
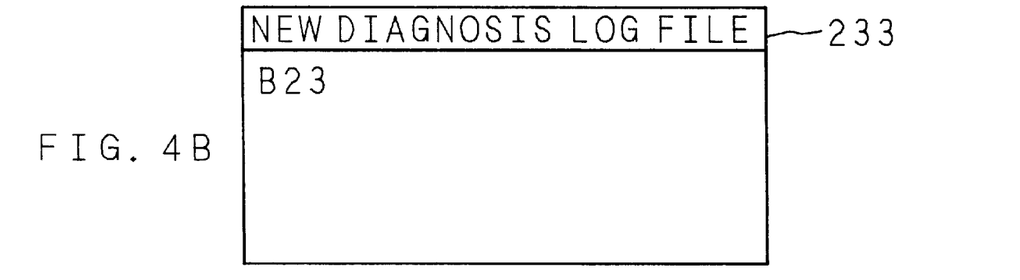

In a case shown in, for example, FIG. 4A, when file "B23" is to be added, "B23" is recorded in the new diagnosis log file 233 as shown in FIG. 4B.

When it is judged that the addition of a file and/or a directory is not necessary ("NO" in step S14), the repair source selection unit 213 reads the current local retaining log file 232 and compares it with the temporary diagnosis log file 231 (step S31). Since information for identifying a file currently stored in the local backup file 24 is recorded in the current local retaining log file 232, it is known, as a result of the comparison, whether or not a file to be updated or deleted already exists in the local backup file 24. Accordingly, when there already exists a file to be updated or deleted in the local backup file 24 ("YES" in step S32), then the information identifying the file is written in the new diagnosis log file 233 with the information which designates the repair source is the local (client unit 2 itself, or more specifically, the local backup file 24) (step S33). On the other hand, when there does not exist a file to be updated or deleted in the local backup file 24 ("NO" in step S32), then only the information identifying the file is written in the new diagnosis log file 233 intact (step S34).

Figure 4C:
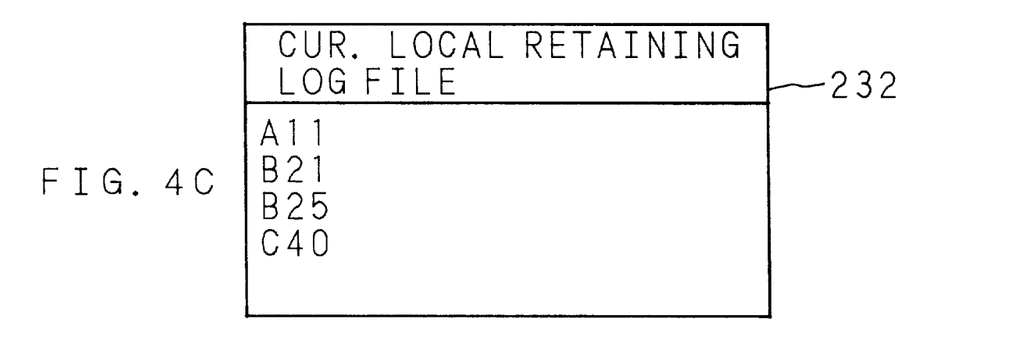
Figure 4D:
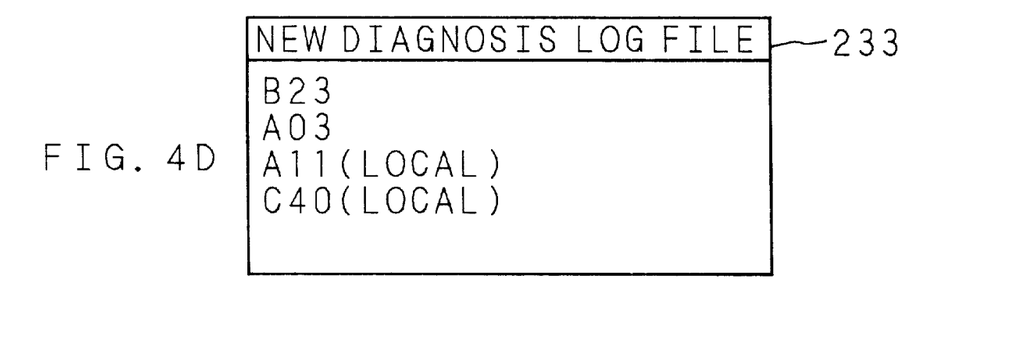

As shown in FIG. 4C, it is assumed that, for example, three files, that is, files "A11", "B21" and "C40" are recorded in the current local retaining log file 232. As such, when the content of the temporary diagnosis log file 231 shown in FIG. 4A and that of this current local retaining log file 232 are compared with each other, the local is designated as the repair source in the new diagnosis log file 233 as shown in FIG. 4D. This is because "A11" and "C40" are recorded in the current local retaining log file 232 shown in FIG. 4C. In addition, since "A03" is not recorded in the current local retaining log file 232 shown in FIG. 4C, the new diagnosis log file 233 records that the file "A03" has no designated local.

While "A23" is also recorded in the new diagnosis log file 233 shown in FIG. 4D, this is a file which has been previously judged to be necessary to be downloaded from the server unit 1.

Upon obtaining the processing results of the steps S34 and S15 mentioned above, the file repair unit 214 issues a repair request to the local backup file 24 when there is a file for which the local (client unit 2 itself) is designated as a repair source, or to the server unit 1 when there are other files having repair requests (step S16). As a result, the transfer of the file from the local backup file 24 to the client system 21, or from the server unit 1 to the client system file 21 is executed (step S17).

In a case illustrated by FIG. 4D, where the local is designated for "A11" and "C40", those files are transferred from the local backup file 24 of the client unit 2 itself to the client system file 21 and then repaired. Since the local is not designated for files "A23" and "A03", those files are transferred from the backup file 11 of the server unit 1 to the client system file 21 of the client unit 2 and then repaired.

Thus, the self-maintenance of the client unit 2 is completed. Next, a local backup diagnosis by the local backup judgment unit 215 is executed (step S18). The detail of this processing is shown in the flow chart of FIG. 3.

The local backup judgment unit 215 first reads the new diagnosis log file 233 and the current local retaining log file 232 shown in FIG. 4C and FIG. 4D, respectively (step S41), and extracts a file which is recorded in the new diagnosis log file 233 and not in the current local retaining log file 232 (step S42).

In this example, files "A23" and "A03" are extracted as ones recorded in the new diagnosis log file 233 and not recorded in the current local retaining log file 232.

Next, the local backup judgment unit 215 reads the local retaining condition file 234 (step S43), and examines whether or not the local retaining conditions are met by comparing the contents of the extracted files with that of the local retaining condition file 234 (step S44).

Figure 5:
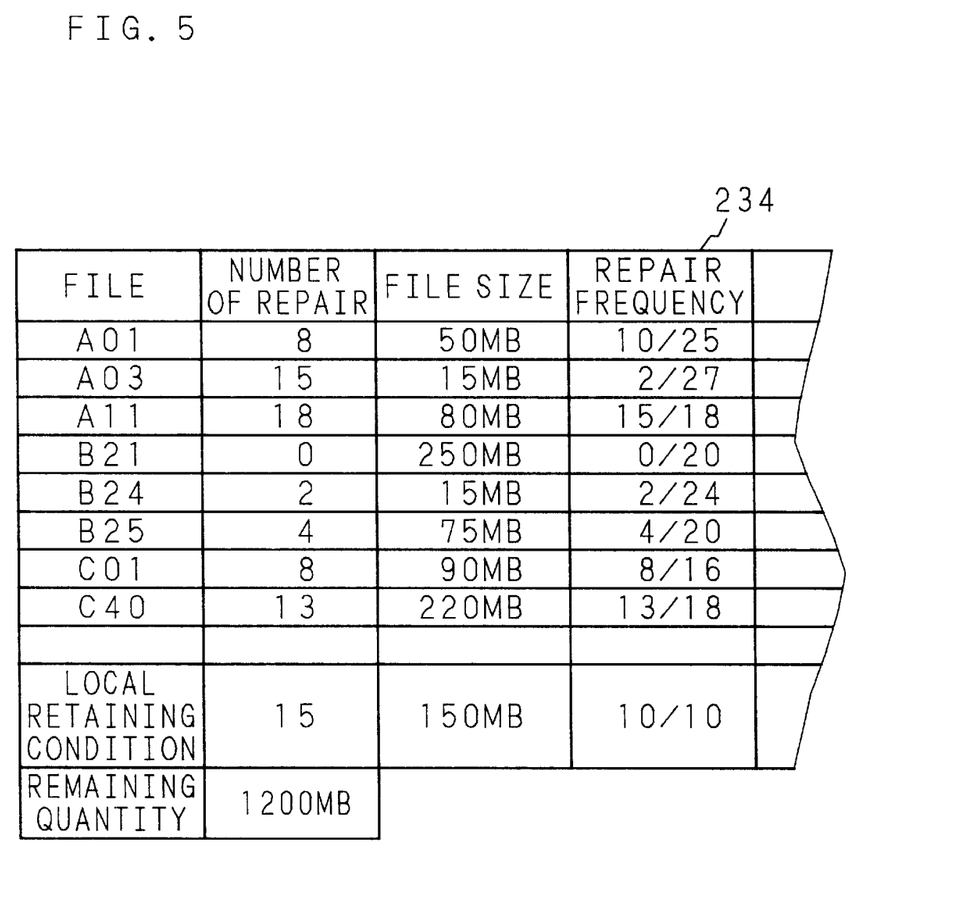
FIG. 5 is a typical view showing the content of the local retaining condition file during self-maintenance by the client unit of the client/server system according to the present invention.

FIG. 5 is a typical view showing an example of the content of the local retaining condition file 234. The file 234 records the number of repairs, file sizes, the frequency of repairs and the like in respect of all the software files which are stored in the client system file 21 of the client unit 2, that is, which can perform functions by the operational unit 211. The local retaining condition file 234 also records conditions such as the number of repairs, the file size, the frequency of repairs and the like set as local retaining conditions. The file 234 further records the remaining capacity of the local backup file 24.

In this example, when files "A01", "A02", "A11", "B21", "B24", "B25", "C01" and "C40" are stored in the client system file 21 of the client unit 2 and can be used, then conditions, such as the number of repairs, file size, the frequency of repairs and the like, for each file are recorded in the new local retaining log file 235. As for the file "A01", the number of repairs is "10", its file size is "50 MB" and the frequency of repairs is "10/25". The frequency of repairs (10/25) means that 10 times of repairs have been carried out while self-maintenance is executed the last 25 times.

As regards local retaining conditions, those for backup-storing a file in the local, that is, the local backup file 24 of the client unit 2 are set such that the number of repairs is "15", the file size is "150 MB" and the frequency of repairs is "10/10". The frequency of repairs "10/10" means that conditions are met when repairs are carried out every time self-maintenance is executed 10 times.

When the result of comparison in step S44 is "YES", then the local backup judgment unit 215 writes information, for example, file name for identifying a file extracted in the preceding step S42, in the new local retaining log file 235 (step S45). The local backup unit 216 then reads the body of the file from the client system file 21, transfers it to and backup-stores the file in the local backup file 24 (step S46).

In the example shown in FIG. 5, "B23" is a file which has been newly downloaded from the server unit 1. Due to this, "B23" does not at all satisfy conditions. Another file "A03" has been repaired 15 times and, therefore, satisfies local retaining conditions. The file "A03" is newly backup-stored in the local backup file 24 of the client unit 2 this time.

Figure 2:
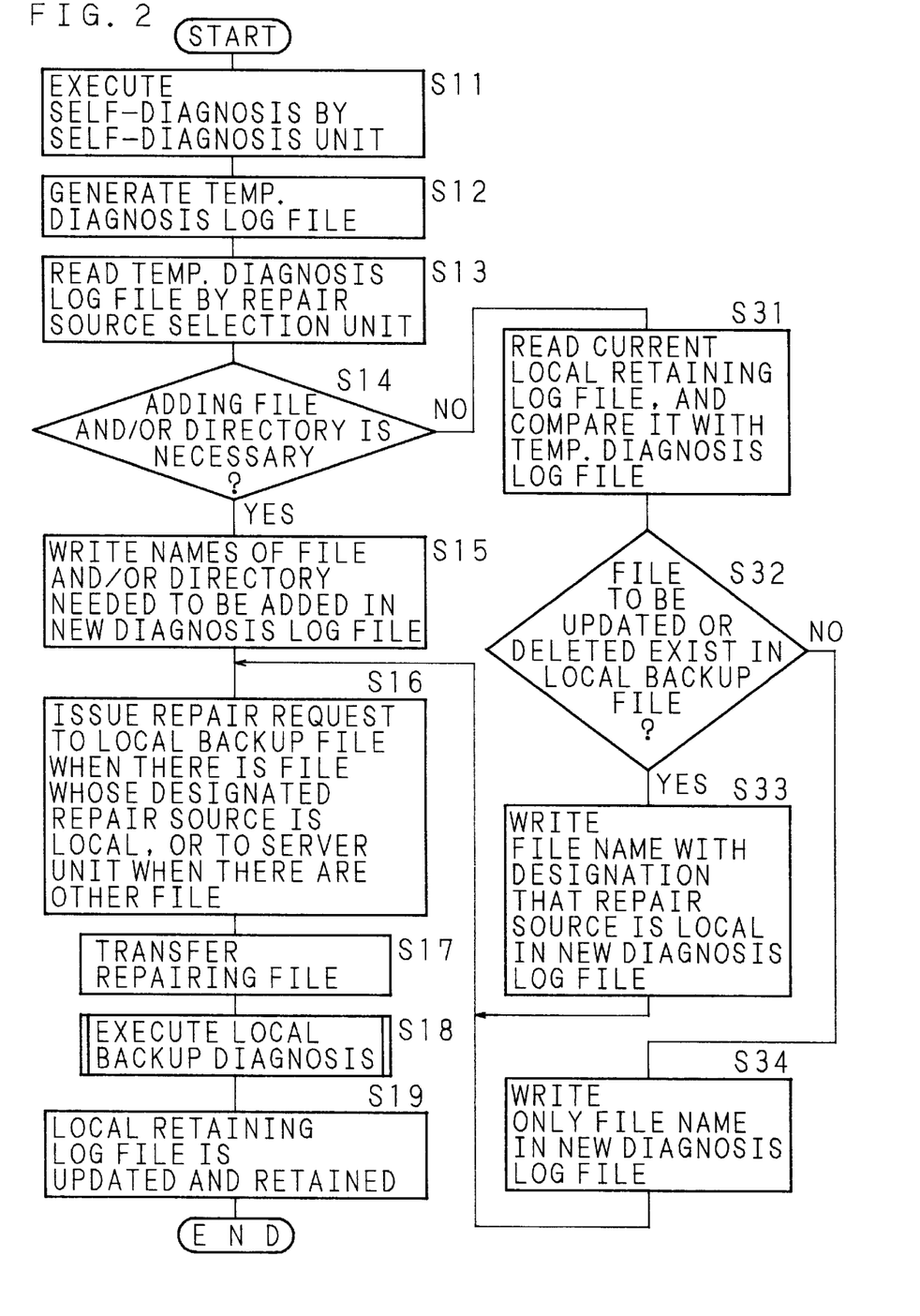
FIG. 2 is a flow chart showing procedures for self-maintenance by the client unit of the client/server system according to the present invention.
Figure 3:
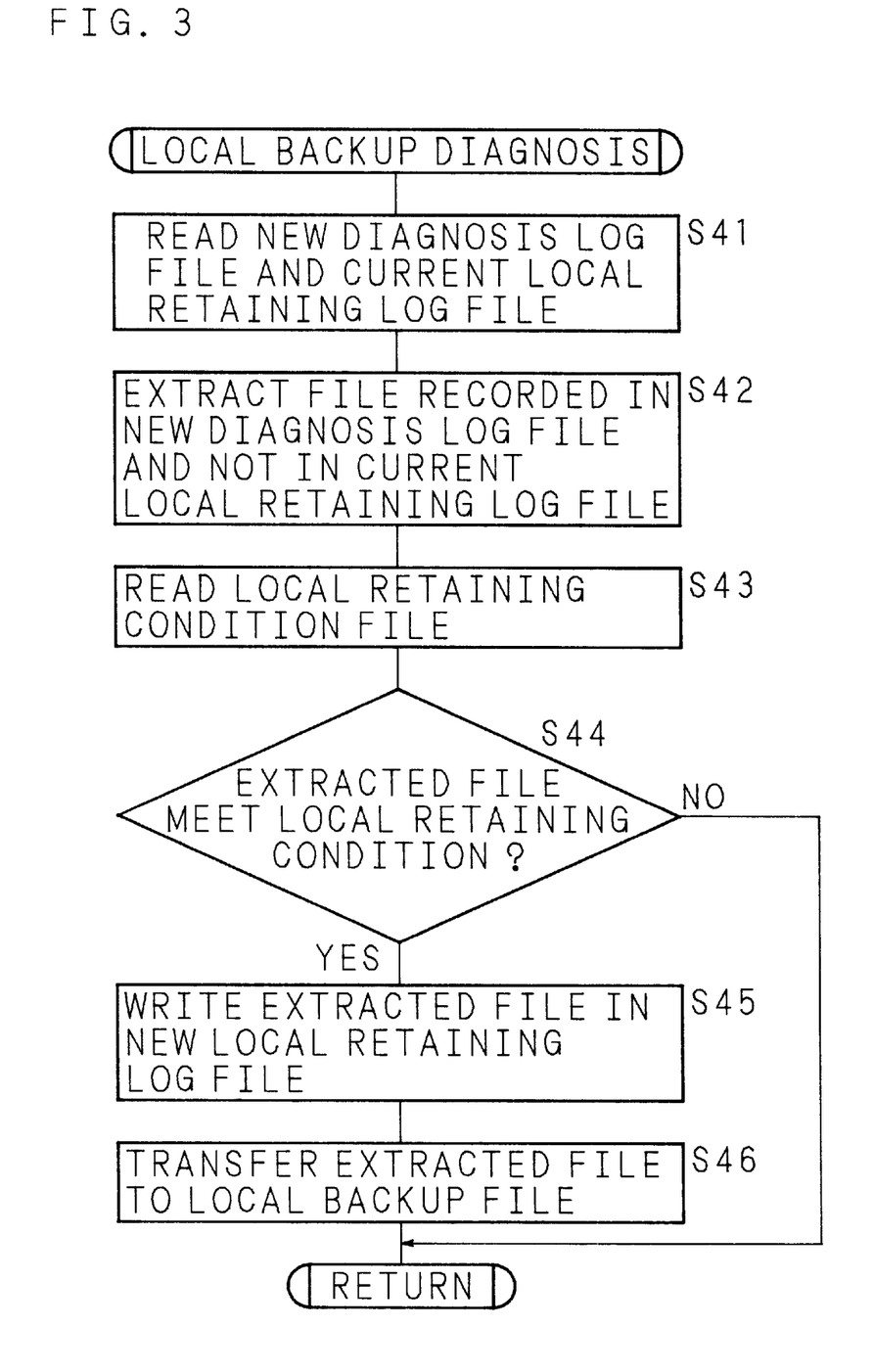
FIG. 3 is a flow chart showing procedures for self-maintenance by the client unit of the client/server system according to the present invention.

When the judgment result in the step S44 stated above is "NO", then the process returns to the main routine shown in FIG. 2 and goes on to the step S19, and the local retaining log file 235 is updated and retained.

In the meantime, the above-stated client/server system according to the present invention is realized by installing software program recorded in the recording media for self-maintenance into the general purpose computer serving as the client unit 2.

Figure 6:
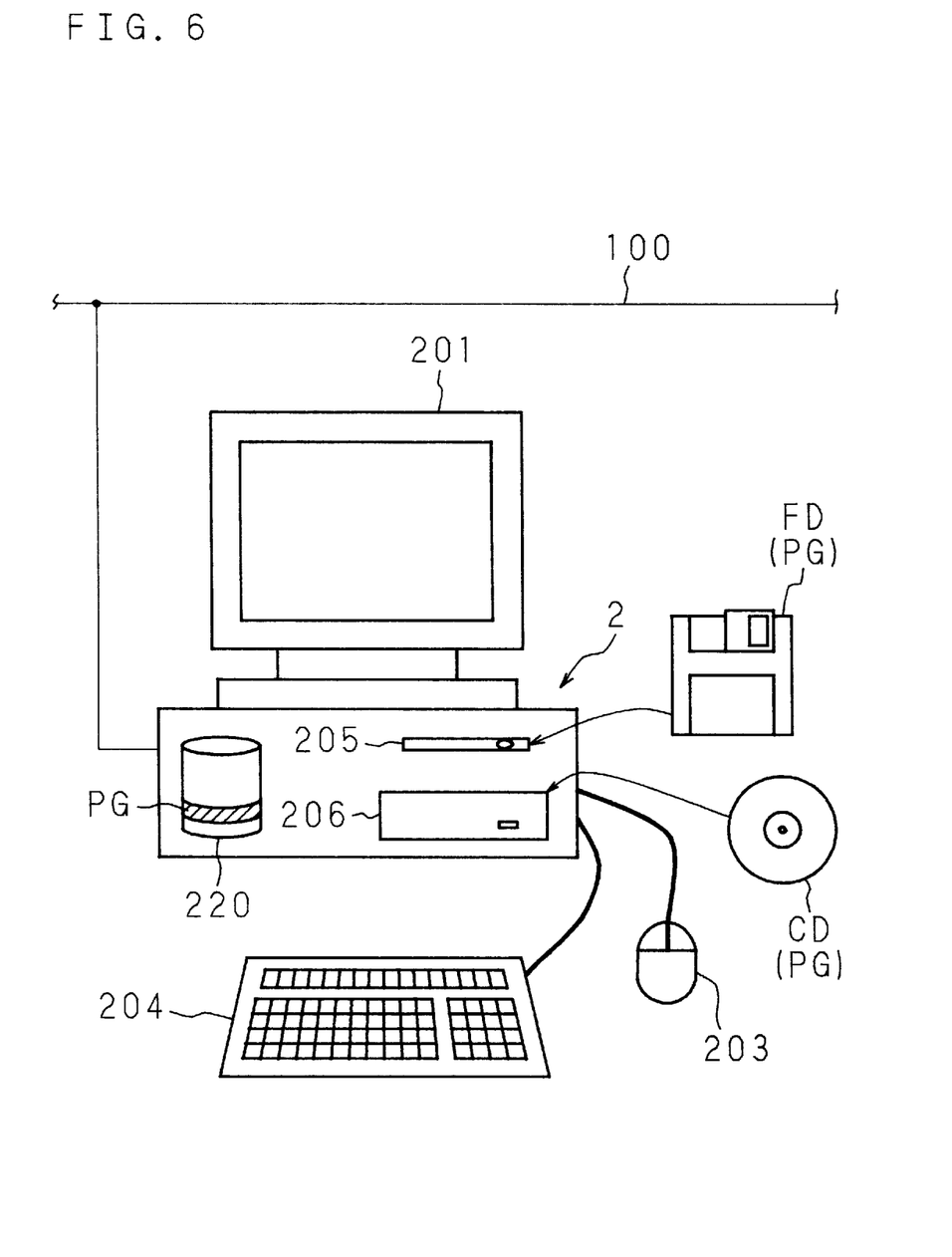
FIG. 6 is a typical view showing an example of the structure of a general purpose computer serving as a client unit of the client/server system according to the present invention.

FIG. 6 is a typical view showing the outline of a general purpose computer serving as the client unit 2. The general purpose computer is provided with a flexible disk drive 205 for reading out the recording content (program codes) from a flexible disk FD storing the above-stated self-maintenance program PG and/or a CD-ROM drive 206 for reading the recording content (program code) from a CD-ROM recording the above-stated processing program PG.

Reference numeral 201 denotes a display device such as a CRT display. Reference numeral 203 denotes a pointing device such as a mouse and 204 denotes an input device such as a keyboard.

The code of the program PG read from the flexible disk FD by the flexible disk drive 205 or the code of the program PG read from the CD-ROM by the CD-ROM drive 206 is installed into, for example, the storage medium 20 utilizing a hard disk, and functions as the self-diagnosis unit 212, the repair source selection unit 213, the file repair unit 214, the local backup judgment unit 215, and the local backup unit 216, as described previously.

The flexible disk FD and/or CD-ROM are shown as recording media in this example. The recording media, however, should not be limited thereto. A magnetic tape, a magneto-optical disc and the like can be, of course, employed as recording media by combining them with appropriate drives (reading means).

Figure 7:
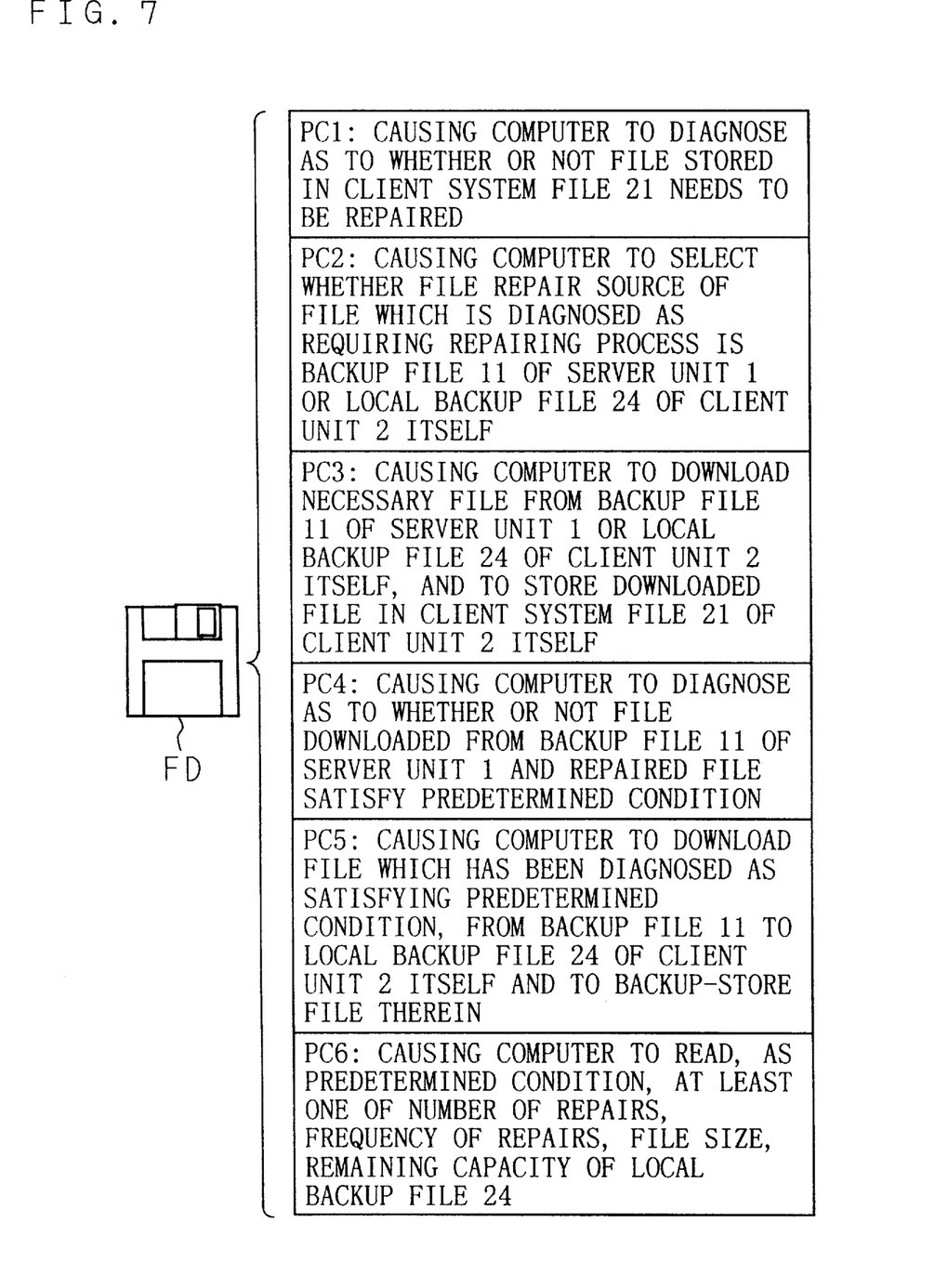
FIG. 7 is a typical view showing the contents of the computer program installed into the general purpose computer serving as a client unit of the client/server system according to the present invention.

FIG. 7 is a typical view showing the content of the program PG recorded in the flexible disk FD which is an example of a recording medium.

The flexible disk PD shown in FIG. 7 records each computer readable program code of computer program for the self-maintenance of the client units 2 of the client/server system, in which the server unit 1 and the client unit 2 are connected to a network, and the server unit 1 is provided with the computer readable first storing means (backup file 11) for storing the files which can be installed into the client units 2, and the client unit 2 is provided with the computer readable second storing means (client system file 21) for storing the software installed into the client unit 2 itself and the computer readable third storing means (local backup file 24) for storing part or all of the files stored in the second storing means.

Specifically, the flexible FD records a program code (PC1) for causing a computer to make a diagnosis as to whether or not a file stored in the second storing means (client system file 21) needs to be repaired, a program code (PC2) for causing a computer to select whether the file repair source of the file which is diagnosed as requiring repairing process is the first storing means (backup file 11) of the server unit 1 or the third storing means (local backup file 24) of the computer (client unit 2) itself, a program code (PC3) for causing a computer to download a necessary file from the first storing means (backup file 11) of the server unit 1 or the third storing means (local backup file 24) of the computer (client unit 2) itself and to store the downloaded file in the second storing means (client system file 21) of the computer (client unit 2) itself, a program code (PC4) for causing a computer to make a diagnosis as to whether or not the file downloaded from the first storing means (backup file 11) of the server unit 1 and repaired file satisfies predetermined conditions, and a program code (PC5) for causing a computer to download the file which has been diagnosed as satisfying the predetermined conditions, from the second storing means (backup file 11) to the third storing means (local backup file 24) of the computer (client unit 2) itself and to backup-store the file therein.

Additionally, the flexible disk FD shown in FIG. 7 also records a program code (PC6) for causing a computer to read, as a predetermined condition, at least one of the number of repairs, the frequency of repairs, a file size, the remaining capacity of the third storing means (local backup file 24)for each file, from the computer readable fourth storing means (local retaining condition file 234) provided to the client unit.

As described so far in detail, according to the client/server system of the present invention, a file which has been repeatedly repaired for times equal to or more than certain times, a file which has been repeatedly repaired with frequency equal to or higher than a certain degree of frequency, a file having a size equal to or larger than a certain size are backup-stored in the third storing means of the client itself. When the file backup-stored in the third storing means needs to be repaired, not the repair through the server but the self-repair within the client can be effected. Even when the number of clients increases, there is no need to review the capability of the server and that of the transmission paths and then re-design them, or there is no fear that, for example, the number of clients cannot be increased.

According to the computer of the present invention, a file which has been repeatedly repaired for times equal to or more than certain times, a file which has been repeatedly repaired with frequency equal to or higher than a certain degree of frequency and a file having a size equal to or larger than a certain size are backup-stored in the third storing means of the computer itself. When the file backed up in the third storing means needs to be repaired, not a repair by the first storing means through the network but a self-repair within the computer can be effected. Thus, there is no need to review the capability of the server and that of the transmission paths and then to re-design them, or there is no fear that, for example, the number of the clients cannot be increased.

Besides, according to the computer serving as a client of the client/server system of the present invention described above, when the operation period reaches or exceeds a certain degree, the probability that the file, which needs to be repaired, needs to be downloaded from the server, is considerably lowered. In addition, the computer serving as the client can be used in a so-called "stand-alone" state.

Further, according to the recording medium of the present invention, a general purpose computer can function as a client of the client/server system of the present invention by causing a computer to read program codes contained in the recording medium.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds of claims, or equivalence of such metes and bounds thereof are therefore intended to be embraced by the claims.

What is claimed is:

1. A client/server system including a server computer and a client computer connected to a network, wherein said server computer comprises first storing means for storing files of software which can be installed into said client computer; and said client computer comprises:

second storing means for storing files of software installed into said client computer itself;

third storing means for storing at least one of the files stored in said second storing means;

self-diagnosing means for diagnosing whether or not a file stored in said second storing means needs to be repaired;

repair source selecting means for selecting one of reading and repairing the file which is diagnosed as requiring repair processing by said self-diagnosing means from said first storing means of said server computer, and reading and repairing the same from said third storing means of said client computer;

file repairing means for repairing the file which is diagnosed as requiring repairing processing by said self-diagnosing means, by reading said file from the repair source selected by said repair source selecting means and storing the file in said second storing means of said client computer itself;

judging means for judging whether or not the file read from said first storing means of said server computer and repaired by said file repairing means satisfies predetermined conditions for storing the file in said third storing means of said client computer itself; and backup means for backing up the file which is judged to satisfy said predetermined conditions by said judging means, by reading said file from said second storing means of said client computer itself, and by storing said file in said third storing means of said client computer itself.

2. The client/server system as set forth in claim 1, wherein said client computer further comprises fourth storing means for storing, as said predetermined conditions, at least one of the number of repairs, the frequency of repairs, a file size of each file, and remaining capacity of said third storing means.

3. A computer which can read files of software from first storing means connected through a network, comprising:

second storing means for storing files of the software installed in said computer itself;

third storing means for storing at least one of the files stored in said second storing means;

self-diagnosing means for diagnosing whether or not a file stored in said second storing means needs to be repaired;

repair source selecting means for selecting one of reading and repairing the file which is diagnosed as requiring repair processing by said self-diagnosing means from said first storing means through said network, and reading and repairing the same from said third storing means of said computer itself;

file repairing means for repairing the file which is diagnosed as requiring repair processing by said self-diagnosing means, by reading said file from the repair source selected by said repair source selecting means and storing said file in said second storing means of said computer itself;

judging means for judging whether or not the file read from said first storing means through said network and repaired by said file repairing means satisfies predetermined conditions for storing the file in said third storing means of said computer itself; and backup means for backing up the file which is judged to satisfy said predetermined conditions by said judging means, by reading said file from said second storing means of said computer itself, and by storing said file in said third storing means of said computer itself.

4. The computer as set forth in claim 3, further comprising fourth storing means for storing, as said predetermined conditions, at least one of the number of repairs, the frequency of repairs, a file size of each file, and remaining capacity of said third storing means.

5. A recording medium which records computer program for causing a computer to execute self-maintenance, said computer capable of reading files of software from first storing means connected through a network, and comprising computer readable second storing means for storing files of software installed into said computer itself and computer readable third storing means for storing at least one of the files stored in said second storing means, said computer program including:

computer readable program code means for causing a computer to diagnosis whether or not a file stored in said second storing means needs to be repaired;

computer readable program code means for causing a computer to select one of reading and repairing the file which is diagnosed as requiring repair processing from said first storing means through said network, and reading and repairing the same from said third storing means;

computer readable program code means for causing a computer to read the file which is diagnosed as requiring repair processing from said selected repair source and to store said file in said second storing means;

computer readable program code means for causing a computer to judge whether or not the file read from said first storing means through said network and repaired satisfies predetermined conditions for storing the file in said third storing means; and computer readable program code means for causing a computer to back up the file which is judged to satisfy said predetermined conditions, by reading said file from said second storing means, and to store said file in said third storing means.

6. The recording medium as set forth in claim 5, wherein said computer program further including computer readable program code means for causing a computer to read from computer readable fourth storing means provided to said computer, as said predetermined conditions, at least one of the number of repairs, the frequency of repairs, a file size of each file and remaining capacity of said third storing means.

* * * * *